United States Patent Office 3,728,312
Patented Apr. 17, 1973

3,728,312
MOLTEN PRODUCTION OF POLYAMIDES FROM TEREPHTHALIC ACID DIALKYL ESTER AND TRIMETHYL HEXAMETHYLENE DIAMINE UNDER REDUCED PRESSURE
Johannes Schneider and Wolfgang Pungs, Troisdorf, Germany, assignors to Dynamit Nobel AG, Troisdorf, Germany
No Drawing. Filed Sept. 18, 1970, Ser. No. 73,675
Claims priority, application Germany, Sept. 18, 1969,
P 19 47 217.4
Int. Cl. C08g 20/20
U.S. Cl. 260—78 R   4 Claims

ABSTRACT OF THE DISCLOSURE

In the production of polyamides by pre-condensing polyamide-forming reactants in the presence of water, removing water, and then polycondensing to form the polyamide, the improvement which comprises terminating the polycondensation when the viscosity of the product falls in the range of about 50 to 90, transferring the material at a temperature of about 200 to 300° C. to a screw extruder having a vacuum outlet, and advancing said material through the screw extruder while continuing polycondensation to a final viscosity of about 116 to 150. Advantageously the polyamide when polycondensation is terminated at a viscosity of 50 to 90 is sent to a feeder bin under pressure of an inert gas and from there is discharged into the screw extruder.

The resulting polyamides, though quite hard, are low melting and thus light stabilizers can be blended therein and the easier working will not degrade the stabilizers, so transparent hollow articles of improved appearance can be made by injection molding.

---

The invention relates to polyamides especially suited for molding transparent hollow articles.

Amorphous, transparent, tough polyamides of high dimensional stability under heat can be produced from dimethyl terephthalate and mixtures of 2,2,4- and 2,4,4-trimethyl hexamethylene diamines, according to British Pat. 1,049,987. They are prepared via a precondensate, with subsequent polycondensation in a closed reaction vessel. Granulates therefrom can be worked in injection molding machines and extruders in the viscosity range of 120 to 180, the viscosity range of 125 to 140 being preferred; the viscosity values are determined in a 0.5% by weight solution in m-cresol at 25° C., according to DIN 53 727. Such polyamides of the indicated viscosities melt in the range of about 198 to 230° C. These condensates are hereinafter referred to as tank condensates.

While such tank condensates can be worked in extruders into transparent solid bars and sections, the production of transparent hollow articles poses difficulties since the poor structure of the walls of these hollow bodies caused by knots, streaks and so-called "fisheyes" prevents such receptacles from meeting practical requirements. These drawbacks could not be eliminated by modified operating conditions in the production of such hollow articles, such as by increasing the temperature or changing the shear conditions of the screw. A particular further drawback is the rapid and pronounced discoloration of these polymers upon exposure to light. A subsequent incorporation of small amounts of known light stabilizers, such as compounds of the benzophenone series, benzotriazole derivatives or salicylates does not effect any substantial improvements, since the high melting temperatures necessitate high processing temperatures which, together with the heat produced by shearing of the highly viscous melt, thermally degrade the stabilizers and thus strongly diminish their effect.

It is accordingly an object of the invention to make polycondensates which are particularly suited for the fabrication of transparent hollow articles and whose melting temperatures are lowered to such an extent that conventional light stabilizers are not degraded upon incorporation therein.

These and other objects and advantages of the invention are realized in accordance with the present invention wherein polyamide-forming reactants in the presence of water are precondensed with removal of water, and then polycondensed until the viscosity of the product falls in the range of about 50 to 90, preferably about 70 to 80. The product is then sent to a reservoir, storage vessel or feeder bin in which it is held at about 200 to 300, preferably about 250° C., under an inert gas blanket which is under pressure, the melt then being fed into a screw extruder provided with a vacuum outlet. The inlet temperature to the screw extruder is about 240 to 300° C. and there is a temperature gradient of about 10 to 20° C. in the direction of the extruder outlet. The extruder discharges polycondensate at a viscosity of about 116 to 150. Preferably the screw extruder includes twin screws rotating in the same direction, receiving polycondensate at about 260 to 280° C. and discharging polycondensate at a viscosity of about 120 to 142.

The polyamide-forming reactants can be a diester of a dicarboxylic acid and a diamine, preferably of an aromatic dicarboxylic acid and an alkyl-substituted alkylene diamine, especially a di-lower alkyl phthalate such as dimethyl terephthalate and a poly-lower alkyl substituted alkylenediamine of about 6 carbon atoms such as 2,2,4- and/or 2,4,4-trimethyl hexamethylene diamine.

The inert gas which protects the polymer is preferably nitrogen, but carbon dioxide or a rare gas can be similarly employed. The gas preferably is under a positive pressure of about 5 to 20 atmospheres.

The final extruder condensate has a melting point commenceing at about 167–170° C. and is substantially completely molten at about 195° C. which is about 30° C. lower than the prior art tank condensate. Nonetheless the extruder condensate has substantially equal dimensional stability under heat, e.g. a Vicat hardness of about 150±5.

The polyamide in chip or granular form may be blended with a light stabilizer, e.g. about 1% by weight, and the blend thereafter molded into shaped articles, especially hollow containers of high optical quality. Representative light stabilizers include 2-(2'-hydroxy-3',5'-di-tert,-butylphenyl)-benzotriazole,
2-(2'-hydroxy 5'-methylphenyl)benzotriazole,
2-hydroxy-4-n-octoxybenzophenone,
2,2'-dihydroxy-4-methoxy-benzophenone,
4,4'-dioxydiphenyl-2,2-propane, and the like.

The polyamides produced according to the invention show a considerably higher light transmission, particularly in the wave length range of 330 to 400 microns. A further advantage is that the method according to the invention makes possible an increase in the space-time efficiency of the reaction apparatus of up to 300%.

The advantages of the invention will be further apparent from the following illustrative examples wherein all parts are by weight unless otherwise expressed.

EXAMPLE 1 (CONTROL)

A tank condensate of the dimethyl ester of terephthalic acid and 2,2,4- and 2,4,4-trimethyl hexamethylene diamines is prepared from 100 parts by weight of dimethyl terephthalate, 84.7 parts by weight of trimethyl hexahexamethylene diamine (1:1 mixture of 2,2,4- and 2,4,4-isomers) and 150 parts by weight of water.

By heating of the starting materials to from 90–100° C. at ordinary pressure, methanol separation begins. The freed methanol is distilled off through a packed column into a condenser. After at least 3 hours, the temperature is raised to 120° C., excess water distiling off to such an extent that a 70%-salt solution is formed. This salt solution is heated in a closed autoclave to about 200° C., the temperature thereafter continually increasing to 225° C. with the pressure then rising to about 25 atmospheres absolute. After 2 hours, the pressure is dropped to atmospheric pressure over 1½ to 2 hours. The melt is then degassed, the temperature raised to 270° C. and the resulting melt is extruded under pressure of nitrogen through a nozzle provided with large orifices to form strands which are then cut to granules or chip.

The physical properties are as follows:

Viscosity, according to DIN 53 727 _____ 120–140.
Density, g./cc., according to DIN 53 479 ___ 1.12.
Ultimate bending stress, kp./cm.², according to DIN 53 452 _____ 1200.
Impact strength, kp./cm.², according to DIN 53 453 _____ No rupture.
Tensile strength, kp./cm.², according to DIN 53 455 _____ 850.
Ball hardness, kp./cm.², according to DIN 53 456 _____ 1400.
Beginning of melting, determined by means of a Kofler - heating table - microscope, ° C. _____ 198.
Melting range up to clear melt, ° C. _____ 198–230.
Dimensional stability—
   According to Martens _____ 100.
   According to Vicat _____ 150.
Air (5 kp.).

Blown hollow articles made therefrom often shows streaks, knots and so-called fisheyes.

EXAMPLE 2

A condensate, according to the invention, of the dimethyl ester of terephthalic acid and 2,2,4- and 2,4,4-trimethyl hexamethylene diamine (1:1) is prepared from 100 parts by weight of dimethyl terephthalate, 84.7 parts by weight of trimethyl hexamethylene diamine and about 175 parts by weight of water. The starting materials are placed in a tank and, under agitation at preferably 90 to 95° C., brought to reaction. At 90° C. methanol starts to split off. The freed methanol is distilled off through a packed column into a condenser. After about 3 hours the temperature is raised and the excess water distilled off to such an extent that a 70%-salt solution forms. This salt solution is heated up to 200° C. in a closed autoclave and transferred to the reaction autoclave. The salt solution is there brought to 225° C., a pressure of about 25 atmospheres absolute then establishing itself. These conditions are maintained until such time as a viscosity of about 75 is obtained. This still reactive melt is then transferred from the reaction autoclave at about 230 to 240° C. to a feeder bin under a nitrogen pressure of 10 atmospheres absolute, and thereafter by means of a double screw extruder with vacuum chamber mounted below the bin, polycondensed under the following conditions and extruded.

Temperatures in the extruder, ° C.:
   Zone 1 _____ 270
   Zone 2 _____ 270
   Zone 3 _____ 260
   Zone 4 _____ 260
Speed of the screws rotating in the same direction, r.p.m. _____ 14
Vacuum setting, mm. Hg. _____ 270

The physical properties of the polyamides are as follows:

Viscosity, according to DIN 53 727 _____ 120–140.
Density, g./cc., according to DIN 53 479 __ 1.12.
Ultimate bending stress, kp./cm.², according to DIN 53 452 _____ 1200.
Impact strength, kp./cm.², according to DIN 53 453 _____ No break.
Tensile strength, kp./cm.², according to DIN 53 455 _____ 800.
Ball hardness, kp./cm.², according to DIN 53 456 _____ 1400.
Beginning of melting, ° C. _____ 170.
Melting range, ° C. _____ 170–195.
Air (5 kp).

Dimensional stability under heat—
   According to Martens, ° C. _____ 100.
   According to Vicat _____ 150.

The blown hollow articles made therefrom are perfect.

EXAMPLE 3

Powdered polyamide and stabilizers were blended by means of rapidly running whirling mixers. The mixtures so produced were processed in a Reifenhäuser single screw extruder (R45) under the following conditions in the melt.

Temperatures:
   Zone 1=entry _____° C__ 240
   Zone 2 _____° C__ 250
   Zone 3 _____° C__ 250
   Zone 4 _____° C__ 260
   Zone 5 _____° C__ 260
Screw speed _____r.p.m.__ 30

The stabilized molding compositions so produced were injection molded in the temperature range of 250 to 280° C. to 2 mm. thick test plates. The behavior of the test plates under the effect of light was tested in the Fade-O-Meter and the following results were obtained with extruder polyamides pursuant to the invention and with control tank polyamides.

TABLE

| Exposure time, hours | Stabilized with 1% by weight of 2-(2'-hydroxy-3',5'-di-tert.-butyl-phenyl)-benzo-triazole | | Stabilized with 1% by weight of 2-(2'-hydroxy-5'-methylphenyl)-benzotriazole | |
|---|---|---|---|---|
| | Extruder condensate | Tank condensate | Extruder condensate | Tank condensate |
| 500 | Unchanged | Dark coloration | Unchanged | Dark coloration. |
| 1,000 | do | Brown | do | Brown. |
| 1,500 | do | Strong discoloration | do | Strong brown coloration. |
| 2,000 | Barely noticeable darkening | | Barely noticeable darkening | |

In the foregoing examples various changes may be made without major change in effect. Thus in Control Example 1 and in Example 2 substantially the same results are achieved if the weight of water in the initial reactants is increased to 300 parts or decreased to 45 parts. Similarly, in Example 2 the polycondensation can be terminated at a viscosity anywhere in the range of about 50 to 90 and the pressure in the screw extruder may be as high as 400 mm. Hg in which case the final viscosity will be lower, or the pressure in the screw extruder may be as low as 140 mm. Hg, i.e. a considerable vacuum, in which case the final viscosity will be higher.

In place of those light stabilizers shown, any others may be similarly employed, the amount generally ranging up to about 5%.

While dimethyl terephthalates and diamines are the preferred reagents, in place of the ester, the salt of the dicarboxylic acid and diamine can also be employed, as well as aminocarboxylic acids and derivatives containing the same functional groups. Other aromatic acids such as isophthalic acid may be substituted for terephthalic acid in whole or in part as may other diamines.

It will be appreciated that the instant specification and examples are set forth by way of illustration and not limitation and that various modifications and changes may be made without departing from the spirit and scope of the present invention.

What is claimed is:

1. In the production of molten polyamides by precondensing a dialkyl terephthalate and a diamine in the presence of water, removing water, and then polycondensing to form the polyamide, the improvement which comprises employing as said diamine a mixture of 2,2,4- and 2,4,4-trimethyl hexamethylene diamine, terminating the polycondensation when the viscosity of said polyamide is in the range of about 50 to 90, transferring the material at a temperature of about 200 to 300° C. to an extruder at a pressure of about 140 to 400 mm. Hg, and advancing said material through the extruder while continuing polycondensation to a final viscosity of about 116 to 150, the polymerization throughout being effected in the melt, the viscosities being determined in 0.5% by weight solution in m-cresol at 25° C.

2. Process according to claim 1, wherein said polycondensate of about 50 to 90 viscosity is sent to a feeder bin under pressure of an inert gas and is discharged from there into said screw extruder.

3. Process according to claim 1, wherein the temperature in the entry zone of said extruder is between about 240 and 300° C. and the temperature gradient toward the outlet is between about 10 and 20° C.

4. Process according to claim 1, wherein polycondensation is terminated when the viscosity of the product falls in the range of about 70 to 80, the polycondensate being sent to a feeder bin under pressure of an inert gas at a temperature of approximately 250° C. and being discharged from there into the screw extruder which includes two screws rotating in the same direction, the temperature gradient toward the outlet of the extruder being between about 10 and 20° C., polycondensation being continued to a final viscosity of about 120 to 142, the final polycondensate then being formed into solid particles.

References Cited
UNITED STATES PATENTS

| | | | |
|---|---|---|---|
| 3,449,299 | 6/1969 | Schneider et al. | 260—78 R |
| 3,454,536 | 7/1969 | Schade et al. | 260—78 R |
| 3,145,193 | 8/1964 | Gabler | 260—78 R |
| 3,294,758 | 12/1966 | Gabler | 260—78 R |
| 3,150,113 | 9/1964 | Gabler | 260—78 R |
| 3,198,771 | 8/1965 | Gabler | 260—78 R |
| 2,172,374 | 9/1939 | Flory | 260—78 R |
| 3,379,695 | 4/1968 | Wolfes et al. | 260—78 R |

HAROLD D. ANDERSON, Primary Examiner

U.S. Cl. X.R.

260—45.8 N, 45.95 R, 45.95 F; 264—95, 176